Patented Oct. 23, 1928.

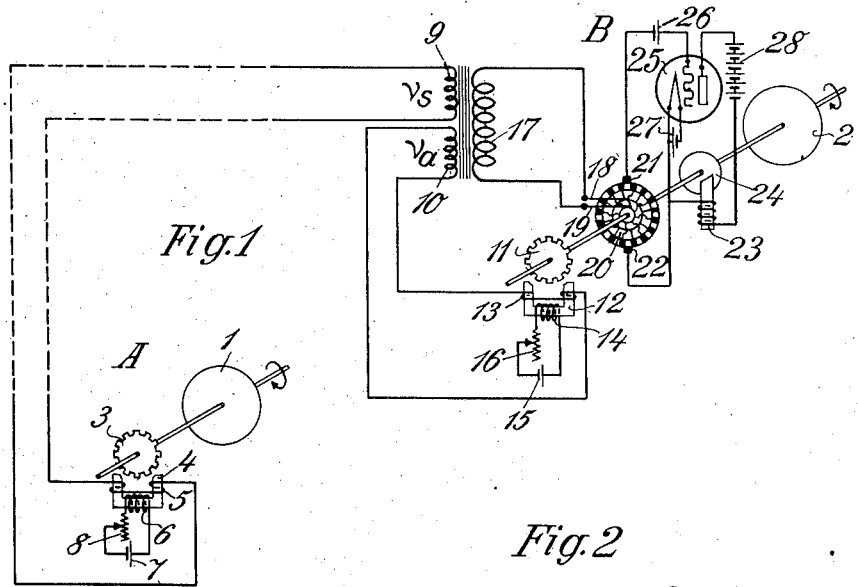

1,688,916

UNITED STATES PATENT OFFICE.

WALTHER BOCK, OF BERLIN-SCHONEBERG, GERMANY, ASSIGNOR TO C. LORENZ AKTIENGESELLSCHAFT, OF BERLIN-TEMPELHOF, GERMANY.

MEANS FOR SYNCHRONIZING TWO OR MORE ROTATING BODIES.

Application filed December 9, 1927, Serial No. 238,982, and in Germany December 11, 1926.

This invention has reference to a process and apparatus for establishing and keeping up a synchronous state of two or more rotating bodies, such as prime movers and the like. Such a synchronous operation is required in a great many systems of the communication art, as for instance in telegraphy and picture transmission.

The system underlying this invention is based on the well known provision of a so-called synchronizing current i. e. an alternating electric current generated by one body referred to as the synchronizing body and having, therefore, a distinct frequency and phase relationship with respect to it, which current is sent to another body referred to as the body to be synchronized with said first mentioned body, to control the frequency and phase conditions of same. According to the special and novel feature of my invention, I superimpose, to this latter end, upon the synchronizing current an auxiliary alternating current whose frequency and phase conditions are dependent on the rotating body to be synchronized, and I apply the resulting current to a mechanical commutator operated to effect commutation synchronously with the auxiliary current generated by the body to be synchronized. The resulting commutated current is used to influence a means adapted to act upon the body to be held in synchronism in a manner to keep up the conditions of synchronous operation.

The invention, as to its organization, as well as its operation is more fully set forth by the following detailed disclosure, reference being had to the accompanying drawings of which Figure 1 shows, by way of example, in diagrammatic form an apparatus embodying the novel features of my invention, whereas Figure 2 represents theoretical curves illustrative of the operation of the device shown by Figure 1. It will be understood that the invention is defined in the appended claims and that the following description relates more particularly to the example shown in the drawings.

According to Figure 1, a rotating member or body 1 driven by a suitable prime mover (not shown in the drawing) being established at a place or station A is to run in complete synchronism with a similar rotating member or body 2 at a distant station B, which body may be driven too by a suitable prive mover (not shown in drawing). The bodies 1 and 2 may for instance represent the revolving sending and receiving drums respectively of a picture telegraph transmission system well known in the art which must be operated in exact synchronism for the purpose of getting an undistorted picture at the receiving end. A small A. C. generator consisting of a toothed disc 3 revolving opposite the pole pieces of a magnet core 4 bearing a winding 5, serves to generate a synchronizing alternating current and, to this end, is fixedly arranged on the shaft of the synchronizing body 1. 6 is an auxiliary winding for regulating the strength of the magnetic field and is fed by the magnetizing current of a D. C. source 7 in series with a regulating resistance 8. Thus, a synchronizing current having a periodicity of $v_s$ cycles which is dependent on the number of teeth and the number of revolutions of the disc is generated in the winding 5 as is well known in the art of electrical engineering. This synchronizing current is transmitted to place B of the body 2 to be synchronized. The transmission of the synchronizing current may be effected by wire, as shown in the drawing or by wireless or even by wired wireless. At the receiving end B the synchronizing current is applied to a primary winding 9 of a differential transformer forming part of the synchronizing apparatus. The second primary winding 10 of the transformer is fed by an auxiliary alternating current having a periodicity $v_a$ cycles which is dependent on the frequency of the body 2 to be synchronized. To this end, an A. C. generator quite similar to that at station A is provided for, consisting of a toothed disc 11 fixedly arranged on the shaft of the body 2, of a magnet coil 12 with A. C. winding 13, 14 being the winding for the magnetization of the coil, and 15 being a D. C. magnetizing source for the latter and 16 a regulating resistance. Both A. C. generators the one at station A as well as the one at station B are of the same structure, i. e. they possess equal pole or tooth pitch, so that with completely exact equality of speed of both bodies 1 and 2, the frequency of the currents generated by them are exactly alike. Instead of the special A. C. generators provided in the present example there may however, be provided any device suitable to serve the purpose in question.

The current resulting of the superposition of the synchronizing current of periodicity $\nu_s$ and the auxiliary current of periodicity $\nu_a$, whose amplitudes preferably are adjusted to the same value by means of the regulating resistances 8 and 16 respectively, is taken from the common secondary winding 17 of the transformer and applied to slip-rings 18 and 19 of the A. C. input side of the mechanical commutator 20. This commutator is fixedly arranged on the shaft of the body 2 to be synchronized and the pitch of its segments is so chosen that one commutating cycle coincides with one cycle of the auxiliary current of periodicity $\nu_a$. The commutated current is taken from brushes 21 and 22 and is fed into the winding of an eddy-current brake 24 of the magnetic drag type which is arranged on the shaft of the body 2 and thus acts to influence its speed of rotation. Preferably the eddy-current brake is given a preliminary magnetization by means of a special auxiliary adjustable D. C. braking-current. To this end, I preferably employ a vacuum tube amplifying device 25 whose grid is influenced by the mean commutated current and whose anode circuit includes the winding 23 of the eddy-current brake. 27 is the heating battery (A battery) for the filament of the tube 25, and 28 is a high-voltage anode battery (B battery) for the supply of the anode current of the tube. By means of a variable grid battery (C battery) 26, the working point on the tube characteristic may be adjusted to a favorable value, and the anode current may be given a distinct preliminary value corresponding to a distinct drag of the eddy-current brake for the normal i. e. synchronous state. With this latter arrangement, an amplification of the brake-influencing current is simultaneously attained.

The curves represented in Figure 2 of the drawings are illustrative of the instantaneous strength and shape of the current supplied by the output side of the commutator and effecting the drag of the brake. This current is simply referred to as the braking current. Let us first suppose that complete synchronism exists between the two bodies 1 and 2 i. e. that these bodies are running at exactly equal speed and are keeping up equal phase relationship, so that the frequency of the synchronizing alternating current $\nu_s$ is exactly alike to the frequency of the auxiliary alternating current $\nu_a$, and let us suppose further that the amplitudes of both currents are of equal value and that their phases are just opposite i. e. displaced by 180 degrees. then it implies therefrom, that both currents cancel each other completely, so far as their combined action is concerned. The braking current supplied by the commutator is, therefore, exactly zero. This state is illustrated by the straight line (zero line) in the middle of Figure 2. Let us now suppose the body 2 to be kept in synchronism with body 1, to lag by a small degree in its rotation with respect to body 1 by same cause or other, i. e. the frequency of $\nu_s$ to increase by a slight amount with respect to the frequency of $\nu_a$, then an initial beat current is beginning to build up out of the superposition of the two currents now having different frequencies, as represented in the upper part of Figure 1. This resulting beat current is acting on the commutator whose brushes are so adjusted that commutation takes place each time the auxiliary current of frequency $\nu_a$ passes its maximum value, so that a braking current establishes itself whose mean value $c$ preferably is lying below the zero line and may be calculated from the areas represented in a shaded fashion in the drawing. Therefore, the magnetic drag of the eddy current brake is decreased, thus imparting to the body 2 a tendency to increase its speed again.

In the opposite case of the body 2 increasing its speed with respect to body 1 by a small degree, with other words of frequency $\nu_s$ decreasing with respect to frequency $\nu_a$ the initial beat current is establishing itself in the manner shown by the lower part of Figure 2. This current subjected to the action of the commutator in the ordinary manner, supplies a braking current whose mean value $c$ is preferably lying above zero line, thus enhancing the braking action of the eddy-current brake and enforcing the body 2 to diminish its speed again i. e. restore its normal synchronous value. As may readily be seen, the mean braking current in case the body 2 has been brought into complete synchronism with the body 1, is oscillating to and fro about its synchronous zero value and exercises a constant tendency to keep up synchronism. In order to increase the braking action to a sufficiently large value, I may employ several braking devices acting simultaneously on the body 2 and controlled by the commutator output braking current in connection with amplifying devices, as may be readily understood.

Instead of an eddy-current brake for influencing the speed of the body 2 as provided according to the synchronizing apparatus just described, I may employ too any arrangement serving the same purpose. For instance in the case of an electric motor being provided to drive the body 2, the resulting braking current may influence the field of the motor thus varying its speed directly whereby a special speed influencing means such as an eddy current brake may be dispensed with.

What I claim to be secured by Letters Patent in the United States is:

1. Apparatus for maintaining two or more rotating bodies in complete synchronism, comprising, in combination, means for producing a synchronizing alternating current with a periodicity corresponding to the speed of one rotating body and having a distinct phase relationship with respect to it, means to transmit said synchronizing current to another rotating body to be operated synchronously with said first mentioned rotating body, means similar to said first mentioned means for producing an auxiliary alternating current with a periodicity corresponding to the speed of said second rotating body to be synchronized and having a distinct phase relationship with respect to it, a rotating commutator driven with said second rotating body to be synchronized and designed to effect commutation synchronously with said second rotating body to be synchronized, the A. C. input side of said commutator being supplied by a current attained by superposition of said synchronizing and said auxiliary currents, and a speed controlling device acting on said rotating body to be synchronized and operated by the mean value of the commutated current supplied by the output side of said commutator.

2. Apparatus for maintaining two or more rotating bodies in complete synchronism, comprising, in combination, means for producing a synchronizing alternating current with a periodicity corresponding to the speed of one rotating body and having a distinct phase relationship with respect to it, means to transmit said synchronizing current to another rotating body to be operated synchronously with said first mentioned rotating body, means similar to said first mentioned means for producing an auxiliary alternating current with a periodicity corresponding to the speed of said second rotating body to be synchronized and having a distinct phase relationship to it, the periodicity of said auxiliary current being alike with the periodicity of said synchronizing current in case of complete synchronism existing between both of said rotating bodies, a rotating commutator driven with said second rotating body to be synchronized and designed to effect commutation synchronously with said auxiliary alternating current, the A. C. input side of said commutator being fed with the current attained by superposition of said synchronizing and said auxiliary currents, and a speed controlling device acting on the rotating body to be synchronized and operated by the mean value of the commutated current supplied by the output side of said commutator.

3. Apparatus for maintaining two or more rotating bodies in complete synchronism, comprising, in combination, means for producing a synchronizing alternating current with a periodicity corresponding to the speed of one rotating body and having a distinct phase relationship with respect to it, means to transmit said synchronizing current to another rotating body to be operated synchronously with said first mentioned rotating body, means similar to said first mentioned means for producing an auxiliary alternating current with a periodicity corresponding to the speed of said second rotating body to be synchronized and having a distinct phase relationship to it, the strength and periodicity of said auxiliary current being alike to the strength and periodicity of said synchronizing current in case of complete synchronism existing between both of said rotating bodies, a rotating commutator driven with said second rotating body to be synchronized and designed to commutate synchronously with said auxiliary alternating current, the A. C. input side of said commutator being fed with the current attained by superposition of said synchronizing and said auxiliary currents, and a speed controlling device acting on the rotating body to be synchronized and operated by the mean value of the commutated current supplied by the output side of said commutator.

4. Apparatus for maintaining two or more rotating bodies in complete synchronism, comprising, in combination, means for producing a synchronizing alternating current with a periodicity corresponding to the speed of one rotating body and having a distinct phase relation with respect to it, means to transmit said synchronizing current to another rotating body to be operated synchronously with said first mentioned rotating body, means similar to said first mentioned means for producing an auxiliary alternating current with a periodicity corresponding to the speed of said second rotating body to be synchronized and having a distinct phase relation to it, a rotating commutator driven with said second rotating body to be synchronized and designed to effect commutation synchronously with said auxiliary alternating current each time it reaches its maximum value the A. C. input side of said commutator being supplied by a current attained by superposition of said synchronizing and said auxiliary currents, and a speed controlling device acting on the rotating body to be synchronized and operated by the mean value of the commutated current supplied by output side of said commutator.

5. Apparatus for maintaining two or more rotating bodies in complete synchronism, comprising, in combination, means for producing a synchronizing alternating current with a periodicity corresponding to the speed of one rotating body and having a distinct phase relationship with respect to it, means to transmit said synchronizing current to another rotating body to be operated synchronously with said first mentioned rotating body, means similar to said first mentioned means for producing an auxiliary alternating current with a periodicity corresponding to the speed of said second rotating body to be synchronized and having a distinct phase relationship to it, the periodicity of said auxiliary current being alike with the periodicity of said synchronizing current in case of complete synchronism existing between both of said rotating bodies, a rotating commutator driven with said second rotating body to be synchronized and designed to effect commutation synchronously with said auxiliary alternating current each time it reaches its maximum value, the A. C. input side of said commutator being fed with a current attained by superposition of said synchronizing and said auxiliary currents, and a speed controlling device acting on the rotating body to be synchronized and operated by the mean value of the commutated current supplied by the output side of said commutator.

6. Apparatus for maintaining two or more rotating bodies in complete synchronism, comprising, in combination, means for producing a synchronizing alternating current with a periodicity corresponding to the speed of one rotating body and having a distinct phase relationship with respect to it, means to transmit said synchronizing current to another rotating body to be operated synchronously with said first mentioned rotating body, means similar to said first mentioned means for producing an auxiliary alternating current with a periodicity corresponding to the speed of said second rotating body to be synchronized and having a distinct phase relationship with respect to it, the periodicity and strength of said auxiliary current being exactly alike with the periodicity and strength of said synchronizing current in case of complete synchronism existing between both of said rotating bodies, a transformer having two primaries alike to each other and fed each by said synchronizing and auxiliary currents respectively, a rotating commutator driven with said second rotating body to be synchronized and designed to commutate synchronously with said auxiliary current each time the latter reaches its maximum value, the A. C. input side of said commutator being supplied by the beat currents established in the secondary winding of said transformer, and a speed controlling device acting on the rotating body to be synchronized operated by the mean value of the commutated current supplied by the output side of said commutator.

7. Apparatus for maintaining two or more rotating bodies in complete synchronism, comprising, in combination, means for producing a synchronizing alternating current with a periodicity corresponding to the speed of one rotating body and having a distinct phase relation with respect to it, means to transmit said synchronizing current to another rotating body to be operated synchronously with said first mentioned rotating body, means similar to said first mentioned means for producing an auxiliary alternating current with a periodicity corresponding to the speed of said second rotating body to be synchronized and having a distinct phase relation to it, a rotating commutator driven with said second rotating body to be synchronized and designed to commutate synchronously with said auxiliary alternating current, the A. C. input side of said commutator being supplied by a current attained by superposition of said synchronizing and said auxiliary currents, and an eddy current brake for controlling the speed of the rotating body to be synchronized and governed by the mean value of the commutated current supplied by the output side of said commutator.

8. Apparatus for maintaining two or more rotating bodies in complete synchronism, comprising, in combination, means for producing a synchronizing alternating current with a periodicity corresponding to the speed of one rotating body and having a distinct phase relationship with respect to it, means to transmit said synchronizing current to another rotating body to be operated synchronously with said first mentioned rotating body, means similar to said first mentioned means for producing an auxiliary alternating current with a periodicity corresponding to the speed of said second rotating body to be synchronized and having a distinct phase relationship with respect to it, the periodicity and strength of said auxiliary current being exactly alike with the periodicity and strength of said synchronizing current in case of complete synchronism existing between both of said rotating bodies, a transformer having two primaries alike to each other and fed each by said synchronizing and auxiliary currents respectively, a rotating commutator driven with said second rotating body to be synchronized and designed to commutate synchronously with said auxiliary current each time the latter reaches its maximum value, the A. C. input side of said commutator being supplied by the beat current established in the secondary winding of said transformer, and an eddy current brake for controlling the speed of the rotating body to be synchronized and governed by the mean value of the commutated current supplied by the output side of said commutator.

9. Apparatus for maintaining two or more rotating bodies in complete synchronism, comprising, in combination, means for producing a synchronizing alternating current with a periodicity corresponding to the speed of one rotating body and having a distinct phase relationship with respect to it, means to transmit said synchronizing current to another rotating body to be operated synchronously with said first mentioned rotating body, means similar to said first mentioned means for producing an auxiliary alternating current with a periodicity corresponding to the speed of said second rotating body to be synchronized and having a distinct phase relationship with respect to it, a rotating commutator driven with said second rotating body to be synchronized and designed to commutate synchronously with said auxiliary alternating current, the A. C. input side of said commutator being supplied by a current attained by superposition of said synchronizing and said auxiliary currents, and a control circuit including a three-electrode vacuum tube having its grid and filament influenced by the mean value of said commutated current, supplied by the output side of said commutator, and means responsive to resulting variations in the plate current of the tube for governing the speed of the rotating body to be synchronized.

10. Apparatus for maintaining two or more rotating bodies in complete synchronism, comprising, in combination, means for producing a synchronizing alternating current with a periodicity corresponding to the speed of one rotating body and having a distinct phase relationship with respect to it, means to transmit said synchronizing current to another rotating body to be operated synchronously with said first mentioned rotating body, means similar to said first mentioned means for producing an auxiliary alternating current with a periodicity corresponding to the speed of said second rotating body to be synchronized and having a distinct phase relationship with respect to it, the periodicity and strength of said auxiliary current being exactly alike with the periodicity and strength of said synchronizing current in case of complete synchronism existing between both of said rotating bodies, a transformer having two primaries alike to each other and fed each by said synchronizing and auxiliary currents respectively, a rotating commutator driven with said second rotating body to be synchronized and designed to effect commutation synchronously with said auxiliary current each time the latter reaches its maximum value, the A. C. input side of said commutator being supplied by the beat currents established in the secondary winding of said transformer, and a control circuit including a three electrode vacuum tube having its grid and filament influenced by the mean value of the commutated current supplied by the output side of said commutator, and an eddy-current brake for controlling the speed of the rotating body to be synchronized and governed by the plate current of said vacuum tube.

In testimony whereof I have affixed my signature.

WALTHER BOCK.